(12) United States Patent
Holman et al.

(10) Patent No.: US 6,519,735 B1
(45) Date of Patent: Feb. 11, 2003

(54) METHOD AND APPARATUS FOR DETECTING ERRORS IN DATA OUTPUT FROM MEMORY AND A DEVICE FAILURE IN THE MEMORY

(75) Inventors: Thomas J. Holman, Portland; Peter D. MacWilliams, Aloha, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/217,814

(22) Filed: Dec. 22, 1998

(51) Int. Cl.[7] .............................................. G11C 29/00
(52) U.S. Cl. ....................... 714/763; 714/764
(58) Field of Search .................... 714/758, 764, 714/746, 763, 765, 769, 766, 772; 364/200; 348/415

(56) References Cited

U.S. PATENT DOCUMENTS

| | | | | |
|---|---|---|---|---|
| 4,072,853 A | * | 2/1978 | Barlow et al. ............... | 714/758 |
| 4,866,604 A | * | 9/1989 | Reid ........................... | 364/200 |
| 4,964,130 A | * | 10/1990 | Bowden, III et al. ....... | 714/764 |
| 5,502,732 A | * | 3/1996 | Arroyo et al. .............. | 714/746 |
| 5,901,160 A | * | 5/1999 | Abe et al. ................... | 348/415 |

* cited by examiner

*Primary Examiner*—David Ton
(74) *Attorney, Agent, or Firm*—Antonelli, Terry, Stout & Kraus, LLP.

(57) ABSTRACT

A method and apparatus for detecting errors in data output from memory and a device failure in the memory. In the invention, a check code is generated based on data to be input to the memory. The check code is valid when equal to zero. The check code is inverted and input along with the data as a codeword to the memory in response to a write command. The codeword is output from the memory in response to a read command. The codeword output from memory indicates whether a device in memory has failed. The inverted check code included in the codeword output from memory is re-inverted. Information indicating whether the data included in the codeword output from memory includes an error is generated based on the data and the codeword including the check code.

34 Claims, 1 Drawing Sheet

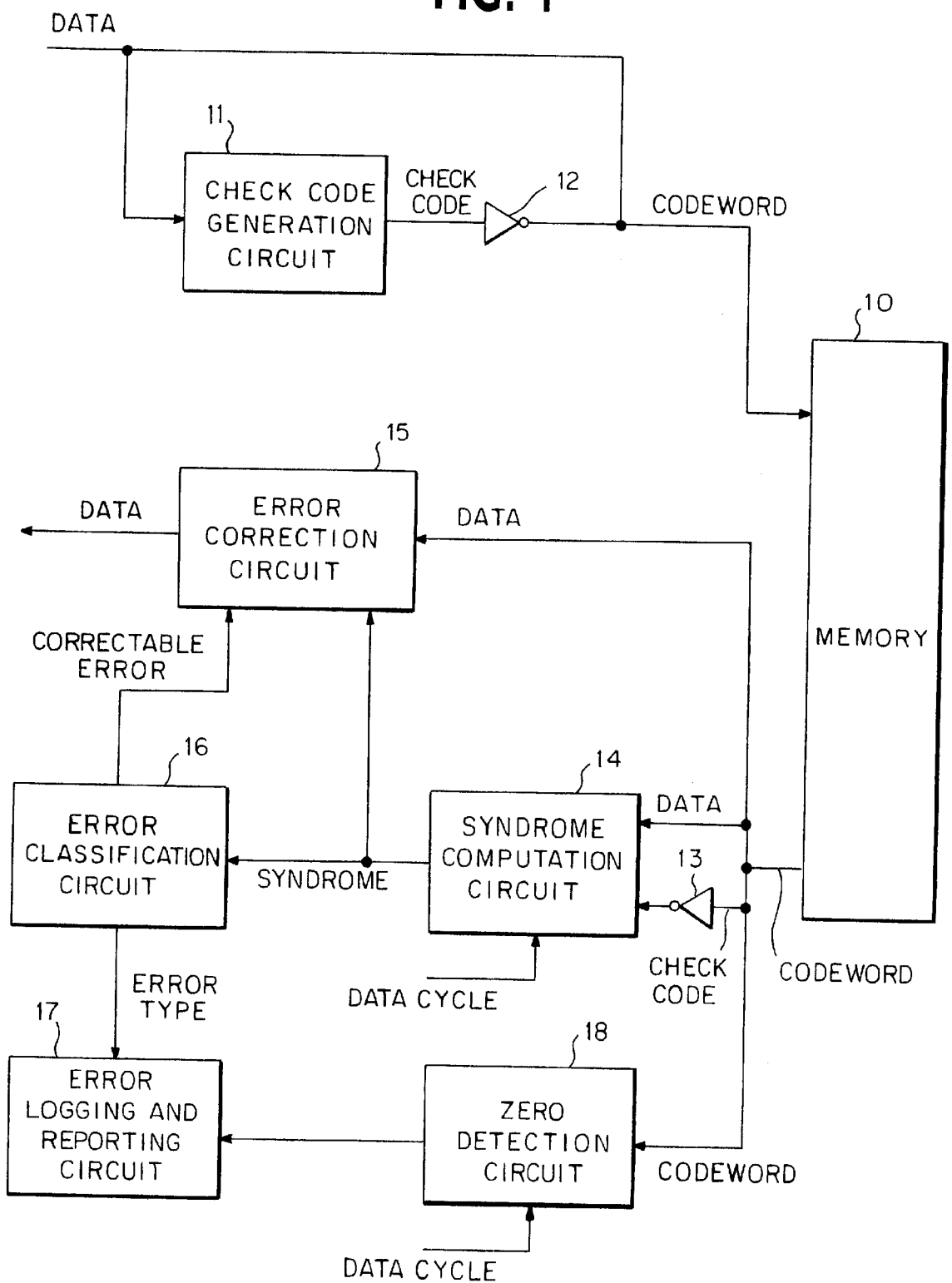

METHOD AND APPARATUS FOR DETECTING ERRORS IN DATA OUTPUT FROM MEMORY AND A DEVICE FAILURE IN THE MEMORY

FIELD OF THE INVENTION

The present invention relates to a method and apparatus for detecting errors in data output from memory relative to the data input to the memory and a device failure in the memory.

BACKGROUND OF THE INVENTION

Apparatus for detecting errors in data output from memory, relative to the data input to the memory are well known to those of ordinary skill in the art. Such error detecting apparatus, for example, makes use of error correction codes which are designed to detect errors in data output from memory relative to the data input to memory and allow for the correction of certain kinds of errors in the data. These error correction codes operate, for example, by constructing the data to be input to memory according to predefined rules of construction. Thus, departures from this construction in data output from the memory may be automatically detected as an error and the detected error can be corrected.

Some of these error correction codes are designed, for example, to easily detect and allow for the correction of the most likely errors committed by a particular type of memory. For example, it may be known that a particular type of memory may commit frequent one-bit errors indicative of a cell which is not properly set. Thus, for example, it would be desirable to use with this type of memory an error correction code which can easily detect one-bit errors.

Error correction codes are particularly desirable, for example, in workstations and servers where applications are being performed by which a higher reliability is desired. Personal computers, which are not normally used in such applications, do not normally use error correction codes. In workstations and servers, for example, it is not only desirable to detect errors which result from a cell not being properly set, but it is also desirable to detect errors that may result from device failures. It is further desirable, for example, to isolate the failed device so that it can be replaced or repaired, if possible.

Well known error detecting apparatus which use error correction codes suffer from various disadvantages in that they were not intended to both detect errors in the data output from memory, and indicate when an error may have resulted from a device failure in the memory. Further, such error detecting apparatus, when using known error correction codes, do not allow for the isolation of the device which may have failed.

SUMMARY OF THE INVENTION

The present invention provides a method and apparatus for detecting errors in data output from memory and a device failure in the memory. In the present invention, a check code is generated based on data to be input to the memory. The check code is valid when equal to zero. The check code is inverted and input along with the data as a codeword to the memory in response to a write command. The codeword, including the inverted check code, is output from the memory in response to a read command. The codeword, including the inverted check code, output from the memory can indicate whether a device in the memory has failed. The inverted check code, included in the codeword output from memory, is re-inverted to obtain the check code. Information is generated based on the data and the codeword including the check code. The information indicates whether the data output from memory includes an error.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description, in which:

FIG. 1 is a schematic diagram of an embodiment of the present invention.

DETAILED DESCRIPTION

FIG. 1 is an example diagram of an embodiment of the present invention. As illustrated, for example, in FIG. 1, data to be stored in memory 10 is input to a check code generation circuit 11 which generates a check code based on the data. The check code can be any one or combination of numerous error correction codes including those known to one ordinary skill in the art, wherein the check code is valid when equal to zero (e.g., all bits are "0") although the invention is not limited in scope in this respect. The check code, for example, could be a well known linear code having generator and parity matrices. The check code from check code generation circuit 11 is inverted by inverter 12. The inverted check code along with the data to be input to memory 10 forms a codeword which is then input, written, stored, etc., in memory 10.

Another embodiment of the invention could, for example, provide that the codeword including the data to be input to memory 10 and the check code from the check code generation circuit 11 is inverted and then input to memory 10. However, such an embodiment is possible, for example, when certain types of check codes are used. Such a code, for example, would cause the codeword to be valid for all values other than all ones, since inverting a codeword of all ones would cause all zeros, to be stored in memory. Outputting all zeros from memory affects the device failure detection operation of the present invention. Thus, when such an embodiment is used a check code is selected which does not have all ones as valid check code.

It should be noted that the present invention is intended to operate in a system wherein the data bus coupled to the memory 10 has a logical value of zero when not driven although the invention is not limited in scope in this respect. Thus, a device, for example, in the memory 10 that may have failed would not drive the bus, thereby outputting all zeros. Also the width of the data bus, for example, may be the same width as the output of the memory 10. The width of the data bus being the same as the width of the output of the memory is highly desirable since it allows for easy identification of a failed device, although the invention is not limited in scope in this respect.

The codeword in its normal use would have zeros as a valid code although the invention is not limited in scope in this respect. However, in this embodiment of the present invention, since the check code is inverted, zero is eliminated as a valid check code. Thus, for example, if a check code of zero (e.g., all bits are "0") is generated by the check code generation circuit 11, then the inverter 12 would invert the check code to one (e.g., all bits are "11"). Accordingly, the check code when combined with the codeword would cause the codeword to not have all zeros as a valid codeword, particularly when, for example, the data included in the codeword includes all zeros.

The inverted check code is stored along with the data in memory 10 as a codeword. The codeword is stored in the memory 10, for example, in response to a write command requesting the write, input or storage of codeword to memory 10.

The memory 10 in response to, for example, a read command, requesting a read or output of a codeword, reads the desired codeword from the memory 10. The codeword output from memory 10 as described above includes the inverted check code and data. The inverted check code is re-inverted by an inverter 13 to obtain the check code. If, for example, the alternative embodiment of the invention is used where the codeword prior to being input to memory is inverted, then the inverted data and the inverted check code included in the codeword output from memory are re-inverted to obtain the data and check code.

The check code and the data are input as a codeword to a syndrome computation circuit 14 which detects, analyzes by computations, and/or identifies groups of data (bits) having a particular pattern indicative of errors in the data output from memory 10. The syndrome computation circuit 14, based on the above described detection, analysis and/or identification process performed on the data and the check code, generates a syndrome value which provides information indicating whether an error is contained in the data. The syndrome computation circuit 14 can, for example, calculate the syndrome value by a sum of the products of the codeword, including the data and the check code from inverter 13, and the data. Thus, for example, the syndrome computation circuit 14 could, for example, include one or a plurality of XOR circuits which may perform the sum of the products operation.

The syndrome value also indicates whether the error is one of a plurality of different types or errors (e.g., one-bit errors, two-bit errors, three-bit errors, four-bit errors, etc.), and the location of such error in the data. The syndrome value is input to an error correction circuit 15 which has input thereto the data included in the codeword output from memory 10. The syndrome value is also supplied to a error classification circuit 16 which evaluates the syndrome value to determine whether the indicated error is any one of a plurality of different classes of errors. At least one of the different classes of errors includes an error that is correctable. A correctable error could, for example, be a one-bit error, a two-bit error, a three-bit error or a four-bit error and so on. Thus, for example, the syndrome value provides to error correction circuit 15 information indicating whether the error is a correctable class of error.

The error correction circuit 15, based upon the syndrome value from the syndrome computation circuit 14 and the indication as to whether the error is a correctable class of error from the error classification circuit 16, corrects the error in the data. The corrected data is then output from the error correction circuit 15 and supplied as the requested data.

The error classification circuit 16 also supplies information concerning the class of the error, and the type of error to the error logging and reporting circuit 17 which logs such information including, for example, information of the time of occurrence of the error, the device in which the error occurred, etc. The error logging and reporting circuit 17 reports such information when requested or periodically. The information can be used at a later point, for example, by a technician to correct the circuit in which the error has occurred by replacement or repair. The information can also be used in a "pair and spare" repair strategy.

Further, as described above, since the check code prior to input to memory 10 is inverted to eliminate zero as a valid check code, an output of zero as a codeword from memory 10 would indicate that a device in the memory 10 has failed. For example, data of "00000000" having a check code of "0" is stored in memory 10 as a codeword of "00000001" due to the inversion by inverter 12. Further, for example, data of "11111111" having a check code of "1" is stored in memory as a codeword of "111111110" due to the inversion by inverter 12. Accordingly, valid codewords, in other words, codewords not indicative of a device failure in memory 10, would be output from memory 10 as a combination of ones and zeros (i.e., "1"s, "0"s). Therefore, a codeword of, for example, "000000000" read out from memory 10 would indicate that the device in memory 10 from which the codeword was obtained has failed. Such can be assumed since valid codewords include a combination of ones and zeros and all zeros in a codeword is indicative of the non-driven state of the data bus coupled to memory 10.

Based on the above, the codeword output from memory 10 is input to a zero detection circuit 18 to detect whether the codeword is zero (e.g., all bits are "0"). If the codeword is zero, then a device in the memory 10 has failed and an indication thereof is provided by the zero detection circuit 18 to the error logging and reporting circuit 17. The error logging and reporting circuit 17 logs information concerning the failed device and reports the same to permit correction or replacement.

Therefore, according to the above, a device failure in the memory 10 can be detected and isolated without affecting the functionality of the check code in detecting errors in the data output from memory. In fact, in this embodiment of the present invention, the check code can be used for two purposes, detecting errors in data output memory and detecting device failures in the memory.

This embodiment can operate with a memory where the data, when output from memory 10, is time multiplexed on the data bus. Such a system exists, for example, in a Rambus (Rambus is a registered trademark of Rambus Corp.) type system. A Rambus type system provides a narrow bus which is used for transferring data between the processor and all other devices connected to the bus. The bus, for example, may be 16 or 18 bits wide. Therefore, when a data signal is transferred it may be 16 or 18 bits wide. When the data signal is 18 bits wide 16 bits may be used for data and 2 bits may be used for error correction codes. The bus, for example, may be coupled in serial to a plurality of RDRAM (RDRAM is a registered trademark of Rambus Corp.) devices, each having a bit width of 18 bits.

In a Rambus type system, for example, data and control signals are transferred in packets. Thus, for example, when an RDRAM is to be read from memory, control circuitry sends to the bus a row control packet which identifies the particular device and the row of the device to be accessed, and a column control packet which identifies the particular device and the column to be accessed. In response to the row control packet and the column control packet, the identified RDRAM in memory allows access to the particular row and column indicated, and the read operation of the data in the location is conducted. The data is then transmitted on the bus from the RDRAM as a data packet. Further, for example, when an RDRAM is to be written to, the control circuitry sends to the bus a row control packet which identifies the particular device and the row of the device to be accessed, and a column control packet which identifies the particular device and the column to be accessed. The control circuitry also sends a data packet of the data to be written into the identified RDRAM. In response to the row control packet and the column control packet, the identified RDRAM allows access to the particular row and column indicated and the write operation of the data in the data packet to the location indicated is conducted.

The data packet transmitted from the RDRAM in response to, for example, a read command includes codewords the same as that described above as being output from memory 10. Each codeword includes data and an inverted check code which are supplied to the inverter 13, syndrome computation circuit 14, error correction circuit 15, and zero detection circuit 18 so as to detect errors in the data based on the data and the codeword, and a device failure in memory based on the codeword. Of course, in the alternative embodiment the codewords themselves are inverted. The data packet transmitted to the RDRAM in response to, for example, a write command includes codewords the same as that described above as being input to the memory 10. Each codeword includes the inverted check code output from the inverter 12 and the data to be input to memory or the codeword is itself inverted according to the alternative embodiment.

Thus, the Rambus type system may include the same circuitry, for example, as illustrated in FIG. 1, except that memory 10 may, for example, include an RDRAM. The zero detection circuit 18 is particularly useful in a Rambus type system in that each data packet transmitted from memory 10 may, for example, include data from one RDRAM device. Thus, a detection of zeros in the data packet would indicated a failure of the RDRAM device which supposedly transmitted the data packet.

Therefore, a device failure can be easily detected and isolated in a Rambus type system. Further, the functionality of the check code is retained in that it still allows for the detection of errors in data output from the RDRAM devices and corrections of the errors based on the detection.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A method of detecting errors in data output from memory and a device failure in said memory, comprising:
   generating a check code based on data to be input to said memory, said check code is valid when equal to zero;
   inverting said check code to produce an inverted check code;
   forming a codeword based on said data and said inverted check code which is input to or output from said memory in response to respective write or read commands, and wherein said codeword output from said memory indicates whether a device in said memory has failed;
   re-inverting said inverted check code in said codeword to obtain said check code; and
   generating information indicating whether said data in said codeword includes an error based on said data and said codeword including said check code.

2. A method according to claim 1, wherein said information generated is used to correct said error in said data.

3. A method according to claim 1, wherein said codeword output from said memory, when equal to zero, indicates that at least one of a plurality of devices, included in said memory, has failed.

4. A method according to claim 1, wherein said information includes a syndrome value which is determined based on a sum of the products of said data and said codeword output from said memory.

5. A method according to claim 4, wherein said syndrome value indicates whether said data output from said memory includes one of a plurality of different types of errors.

6. A method according to claim 5, wherein said different types of errors includes at least a one bit error.

7. A method according to claim 5, wherein said different types of errors represent different classes of errors, and
   wherein at least one of said different classes of errors is correctable.

8. A method according to claim 7, further comprising:
   logging each error indicated by said syndrome according to a class of said error; and
   reporting said error and said class of said error.

9. A method according to claim 1, wherein said information indicates whether said data included in said codeword output from said memory includes one of a plurality of different types of errors.

10. A method according to claim 9, wherein said different types of errors includes at least a one bit error.

11. A method according to claim 9, wherein said different types of errors represent different classes of errors, and
   wherein at least one of said different classes of errors is correctable.

12. A method according to claim 11, further comprising:
   logging each error indicated by said information according to a class of said error; and
   reporting said error and said class of said error.

13. An apparatus for detecting errors in data output from memory and a device failure in said memory, comprising:
   a first generator circuit which generates a check code based on data to be input to said memory, said check code is valid when equal to zero;
   a first inverter which inverts said check code to produce an inverted check code, wherein said data and said inverted check code form a codeword which is input to or output from said memory in response to respective write or read commands, and said codeword from said memory indicates whether a device in said memory has failed;
   a second inverter which re-inverts said inverted check code in said codeword to obtain said check code; and
   a second generator circuit which generates information indicating whether said data includes an error based on said data and said codeword including said check code.

14. An apparatus according to claim 13, further comprising:
   an error correction circuit which corrects said error in said data based on said information from said second generator circuit.

15. An apparatus according to claim 13, further comprising:

a zero detection circuit which detects whether said codeword, from said memory is equal to zero, and, when said codeword is equal to zero, indicates that at least one of a plurality of devices, included in said memory, has failed.

16. An apparatus according to claim 13, wherein second generator circuit is a syndrome computation circuit which computes as said information a syndrome value based on a sum of the products of said data and said codeword from said memory.

17. An apparatus according to claim 16, wherein said syndrome value computed by said syndrome computation circuit indicates whether said data from said memory includes one of a plurality of different types of errors.

18. An apparatus according to claim 17, wherein said different types of errors includes at least a one bit error.

19. An apparatus according to claim 17, further comprising:
an error classification circuit which classifies said different types of errors into different classes of errors,
wherein at least one of said different classes of errors is correctable.

20. An apparatus according to claim 19, further comprising:
an error logging and reporting circuit which logs each error indicated by said syndrome according to a class of said error, and reports said error and said class of said error.

21. An apparatus according to claim 13, wherein said information indicates whether said data in said codeword from said memory includes one of a plurality of different types of errors.

22. An apparatus according to claim 21, wherein said different types of errors includes at least a one-bit error.

23. An apparatus according to claim 21, further comprising:
an error classification circuit which classifies said different types of errors into different classes of errors, wherein at least one of said different classes of errors is correctable.

24. An apparatus according to claim 23, further comprising:
an error logging and reporting circuit which logs each error indicated by said information according to a class of said error, and reports said error and said class of said error.

25. A method of detecting errors in data output from memory and a device failure in said memory, comprising:
generating a check code based on data to be input to said memory;
inverting said check code, wherein said data and said inverted check code form a codeword which is input to or output from said memory in response to respective write or read commands, said check code is a type that causes said codeword to have a value other than all ones when valid, and said codeword output from said memory, when equal to zero, indicates that at least one of a plurality of devices, included in said memory, has failed;
re-inverting said codeword to obtain said data and said check code; and
generating information indicating whether said data in said codeword includes an error based on said data and said codeword.

26. A method according to claim 25, wherein said information generated is used to correct said error in said data.

27. A method according to claim 25, further comprising:
determining an error type based on said information; and
reporting said error type and a device failure indication for error correction.

28. An apparatus for detecting errors in data output from memory and a device failure in said memory, comprising:
a first generator circuit which generates a check code based on data to be input to said memory;
a first inverter which inverts said data and said check code, wherein said inverted data and check code form a codeword which is input to or output from said memory in response to respective write or read commands, said check code being of a type that causes said codeword to have a value other than all ones when valid, and said codeword from said memory indicates whether a device in said memory has failed;
a second inverter which re-inverts said codeword to obtain said data and said check code;
a second generator circuit which generates information indicating whether said data includes an error based on said data and said codeword; and
a zero detection circuit which detects whether said codeword, from said memory is equal to zero, and, when said codeword is equal to zero, indicates that at least one of a plurality of devices, included in said memory, has failed.

29. An apparatus according to claim 28, further comprising:
an error correction circuit which corrects said error in said data based on said information from said second generator circuit.

30. An apparatus according to claim 28, further comprising:
an error classification circuit which classifies different classes of errors, wherein at least one of said different classes of errors is correctable; and
an error logging and reporting circuit which logs each error indicated by said information according to a class of said error, and reports said error and said class of said error.

31. A method of detecting device failure in a memory subsystem, comprising:
applying a given error correction code (ECC) having inverted check bits to data to be written into memory;
writing a resulting codeword including the data and the ECC code having the inverted check bits into said memory in accordance with a write command;
reading the resultant codeword including the data and the ECC code having the inverted check bits from said memory in accordance with a read command; and
determining if the resultant codeword including the data and the ECC code having the inverted check bits read from said memory contains one or more errors, and indicates that at least one of a plurality of memory devices, included in said memory, has failed,
wherein, after the resultant codeword is read from said memory, the inverted check bits of the ECC code included in the resultant codeword read from said memory are re-inverted, and the resultant codeword is then applied to a syndrome computation and a zero computation respectively, to determine the presence of one or more errors and the presence of at least one device failure from said plurality of memory devices included in said memory.

32. The method according to claim 31, further comprising:
  determining an error type as defined by the given ECC code based on a syndrome obtained from said syndrome computation, when the resultant codeword including the data and the ECC code read from said memory contains one or more errors; and
  logging and reporting the error type and device failure indications.

33. The method according to claim 32, further comprising:
  performing error correction of the data included in the resultant codeword read from said memory, when the ECC code included in the resultant codeword is capable of error correction, and an indication of one or more errors and the syndrome obtained from said syndrome computation are provided for said error correction.

34. The method according to claim 31, wherein the resultant codeword read from said memory contains no error when the resultant codeword written into said memory is equal to the resultant codeword read from said memory, and contains one or more errors when the resultant codeword written into said memory is not equal to the resultant codeword read from said memory.

* * * * *